Dec. 18, 1962 R. T. ADAMS 3,069,631
DIVERSITY RECEIVING SYSTEM
Filed March 7, 1960
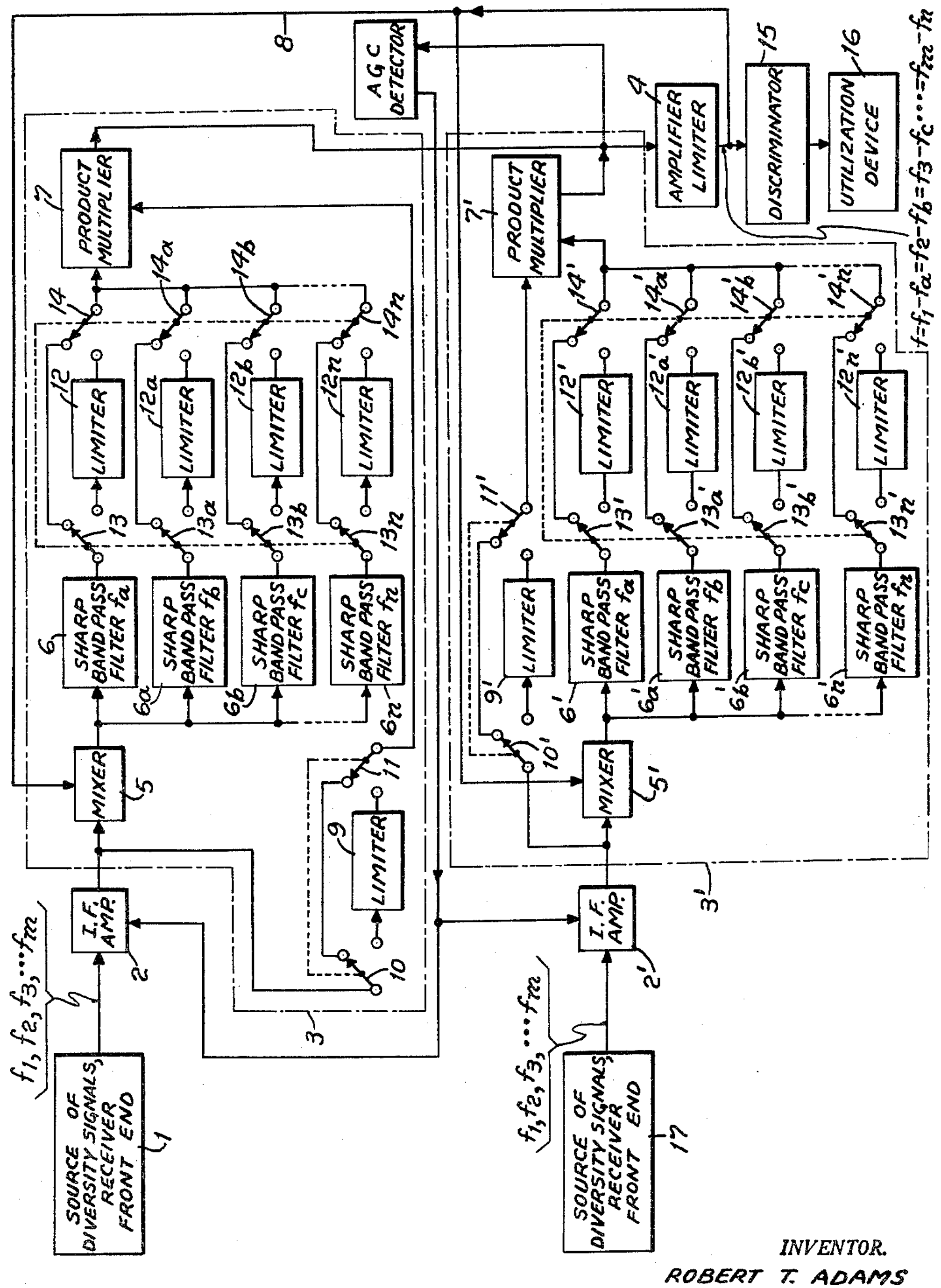
INVENTOR.
ROBERT T. ADAMS
BY Alfred C. Hill
AGENT 3,069,631

DIVERSITY RECEIVING SYSTEM

Robert T. Adams, Short Hills, N.J., assignor to International Telephone and Telegraph Corporation, Nutley, N.J., a corporation of Maryland Filed Mar. 7, 1960, Ser. No. 13,153
20 Claims. (Cl. 328—137)

This invention relates to diversity receiving systems and more particularly to an improved predetection combiner therefor.

Predetection diversity combiners of the phase combiner type operate to combine phase locked signals in a linear adding circuit, such as a hybrid circuit. One form of phase combiner employs one hybrid circuit for every two diversity signals (two folds of diversity). The two signals are each translated to the intermediate frequency (IF) range by a mixer and local oscillator prior to being coupled to the hybrid circuit. The two signals at the input of the hybrid circuit are compared in phase and a control signal related to the detected phase difference is used to adjust the local oscillator associated with at least one of the signals for cophasal addition in the hybrid circuit. To extend the phase combiner to handle more than two folds of diversity, for instance four folds of diversity, it is necessary to pair the diversity signals for combining at IF in an associated hybrid circuit with the resultant signals at the output of the two hybrid circuits being combined in a third hybrid circuit to provide a single combined signal. In this arrangement phase lock of the four signals is obtained by comparing the phase of each signal prior to combining with the single combined signal. A phase control is then produced to operate on the local oscillator associated with each of the diversity signals to establish the desired phase relationship for cophasal combining. In the phase combining arrangement, whether used for two or more folds of diversity, it is preferable to provide automatic gain control for the IF amplifiers of each signal channel. The automatic gain control is obtained by detecting a portion of the combined output and feeding back the resultant control signal to the control point of each signal channel. In this manner the various intermediate frequency signals at the point of combination are each proportional to their respective received carriers.

The relatively new diversity technique known as angle diversity preferably employs a relatively large number of folds of diversity in the order of ten or more. To combine the resultant diversity signals of this type of diversity system, the above-described phase combiner results in a hybrid "tree" wherein the input signals are paired for combining and then pairs of these resultant signals are combined, and so forth, until a single resultant signal is obtained. While this is a solution to combining the signals of a multifold diversity system, the resulting hybrid "tree" is quite lossy and requires a relatively large amount of equipment, such as hybrid circuits, a phase comparator for each channel, and a mixer-phase-adjusted oscillator combination for each channel. A solution to eliminate the hybrid "tree" is to provide a signal channel for each of the diversity signals, translate the signals to the IF range as before, combine all of the resultant IF signals on one output bus, compare the phase of each signal with the combined signal in separate phase comparators and couple the output of each phase comparator to its associated local oscillator to adjust the phase of the IF signal of each channel for cophasal addition on the output bus. While this solution eliminates the hybrid circuits and the loss resulting from the hybrid "tree" it is obvious that there is still a large amount of equipment necessary for each signal channel which must be repeated for each fold of diversity added to a multifold diversity system.

Another arrangement to solve the loss problem includes a separate signal channel for each fold of diversity or diversity signal. The signal of each channel is correlated against the combined and frequency-shifted output signal of the arrangement and a signal at the beat frequency builds up in a sharply tuned filter associated with each channel. The degree of correlation determines the magnitude of the signal stored in each sharp filter which determines the proportion of each diversity signal transferred by means of a product multiplier coupled thereto to the combined output signal. While this arrangement eliminates the hybrid "tree" and, hence, the resultant loss, each fold of diversity added to a multifold diversity system requires the addition of another signal channel including a mixer, a sharply tuned filter and a product multiplier.

An object of this invention is to provide a predetection diversity combiner employing a technique similar to the last combiner discussed hereinabove but having considerable circuit simplification resulting in a reduction of equipment.

Another object of this invention is to provide a predetection diversity combiner requiring the addition of only one circuit component for each fold of diversity added to a multifold diversity system.

Other objects of this invention are to provide a predetection diversity combiner operating at a carrier-to-noise ratio significantly lower than existing combiners, capable of combining a large number of diversity signals, say in the order of 100, without undue equipment increase and complexity and enabling the simplification of the front end of the diversity receiving system since one wide band receiver may be employed to receive and translate several frequency spaced diversity signals to the IF range for application directly to a single input of the improved predetection diversity combiner.

There will be employed in the specification and the claims a phrase "frequency spaced diversity signals." This phrase is not meant to limit the combining system of this invention to utilization in only frequency diversity systems. This phrase is employed to indicate that the diversity signals are spaced in frequency an amount sufficient to provide uncorrelated signals such as employed in frequency diversity signals, or an amount not necessarily sufficient to render the signals uncorrelated but which will permit a better utilization of the scatter area, such as is advantageous in angle diversity systems, or any other known type of diversity system where such a frequency spacing may be advantageous.

A feature of this invention is the provision of a first means responsive to a given or reference signal and a plurality of input signals to produce a plurality of predetermined signals and a plurality of second means coupled to the first means each responding to a different one of the predetermined signals. The outputs of each of the second means are coupled to a third means which has the input signals coupled thereto to produce the given signal having a predetermined frequency and an amplitude related to the cophasal addition of the input signals.

Another feature of this invention is the provision of a sharply tuned filter responsive to the beat frequency produced by the combined or reference signal and one of the plurality of diversity signals coupled to the single input of the combiner system with the output of the filter being combined with the input signals to cooperate in producing the combined signal. The number of filters employed in the combiner of this invention is equal to the member of diversity signals or folds in a multifold diversity system.

Still another feature of this invention is the provision of an amplitude product-taking and frequency mixing device (a product multiplier) responsive to the output signal of the filters and the input signals of the combiner to render the amplitude of the IF combined output signal proportional to the square of the amplitude of input carrier and, hence, the combiner of this invention is a ratio squared predetection combiner. By suitably limiting the amplitude of one of the signals applied to the product multiplier the combiner of this invention becomes a linear combiner.

The above-mentioned and other features and objects of this invention will become more apparent by reference to the following description taken in conjunction with the accompanying drawing, in which; the sole FIGURE is a schematic diagram in block form of a predetection diversity combiner following the principles of this invention.

Referring to the figure, a plurality of diversity signals differing in frequency are coupled from source 1 to an IF amplifier 2 and, hence, to the single input of the circuit arrangement 3 providing the predetection combining in accordance with the principles of this invention. The source 1 may be a single wide band receiver front end capable of receiving a plurality of frequency spaced diversity signals which may be combined in the combiner of this invention without interaction or degradation providing the frequency separation between the frequency spaced input signals is greater than one half the bandwidth of the amplifier-limiter 4, the output of which provides the given or reference signal employed in a certain portion of the arrangement 3 as described hereinbelow.

The diversity signals applied to the single input of arrangement 3 are coupled to a first means, such as mixer 5, to produce in response to the given or reference signal coupled from amplifier-limiter 4 to produce a plurality of predetermined signals, such as beat frequency signals, frequency spaced one from the other. The beat frequency signals at the output of mixer 5 are coupled to a plurality of second means, such as sharp bandpass filters 6, with each of the filters being tuned to respond to a given one of the beat frequency signals of mixer 5. Filters 6 may be quartz crystal type filters. A third means in the form of product multiplier 7 is coupled to the output of each of the filters 6 and to output amplifier 2. The action in product multiplier 7 produces the given signal having a predetermined frequency equal to the difference frequency between the input signals and the beat frequency signals at the output of mixer 5 and having an amplitude related to the cophasal addition of the input signals. The given or reference signal is coupled by means of amplifier-limiter 4 and conductor 8 to mixer 5 to act as the reference frequency for the operation of mixer 5. Product multiplier 7 is a frequency mixer (heterodyning device) and an amplitude product-taking device, whose signal output has a frequency equal to the beat frequency of the frequency of the signals applied thereto and an amplitude proportional to the product of the amplitude of the carrier of a particular one of the input signals and the amplitude of the associated beat frequency signal passed by filters 6, or in other words, proportional to the square of the amplitude of the carrier of a particular one of the input signals.

More specifically, each input signal is beat with the given or reference signal in mixer 5 to product a different continuous wave beat frequency signal corresponding to each of the input signals. Each of the beat frequency signals "builds up" in the appropriate one of filters 6 in direction proportion to the degree of correlation between the associated input signal and the combined given signal, or in other words, the signal-to-noise ratio of the input signal. The signal stored in filters 6 may be considered to act as a reference for their associated input signal since the output signals of filters 6 control product multiplier 7 and determine the contribution of their associated input signal to the combined reference signal.

The combiner starts in a manner similar to an oscillator, namely, any given signal building up at the output of amplifier-limiter 4 to produce a reference signal which is therefore well correlated with itself "builds up" a strong continuous wave beat frequency signal proportional to its signal-to-noise ratio in its associated one of filters 6. Other incoming signals "build up" continuous wave beat frequency signals in their respective filters in direct proportion to their signal-to-noise ratio. Each of the beat frequency signals has the same phase relation with respect to the reference signal as does its associated input signal. This is inherent in the operation of a mixer. When the stored signal in filters 6 is mixed with its associated input signal in product multiplier 7, the resultant beat frequency signal is in phase with the reference signal since the action of product multiplier 7 cancelled the identical phase relation of the stored beat frequency signal and its associated input signal. The action is the same in mixer 5 and product multiplier 7 for each input signal and its associated beat frequency stored in filters 6 and since the same reference signal is used for all input signals the output of product multiplier 7 is cophasal with the reference signal and is the cophasal combination of the input signals. The output of product multiplier 7 after action thereon by amplifier-limiter 4 is the reference signal in accordance with the principles of this invention.

Considering in more detail the operation of the combiner of this invention numerical values will be specified for illustrative purposes. Let us consider one carrier at 70 megacycles (mc.). This incoming carrier is transformed in mixer 5 by means of the 60 mc. reference signal to a beat frequency of 10 mc. which is stored in filters 6. The 10 mc. signal at the output of filters 6 is applied to product multiplier 7. At product multiplier 7, the 10 mc. signal is remixed with the 70 mc. input signal to yield a 60 mc. output signal. The amplitude of the 60 mc. signal resulting from the 70 mc. input signal is equal to the amplitude of the 70 mc. signal times the amplitude of the 10 mc. The 60 mc. output signal is coupled to amplifier-limiter 4, which will accept a band of signals of a given width, let us say 500 kilocycles (kc.), to enable discrimination against all other beat frequency signals which are generated in product multiplier 7. At the output of amplifier-limiter 4, the 60 mc. signal is the combiner output signal which is demodulated in discriminator 15 for utilization in device 16 and is also the local oscillator signal employed in the first mixing process that takes place in mixer 5. The system is therefore essentially a regenerative mixer with one carrier alone in the system.

Let us now consider what happens in the presence of two or more carriers. As mentioned hereinabove with one carrier alone the system is a regenerative mixer. Amplifier-limiter 4 provides sufficient gain so that with a feedback at 60 mc. the system will oscillate. It will find a frequency corresponding to the 10 mc. filter, namely, filter 6, and cannot oscillate at frequencies corresponding to the 11, 12, etc. mc. filters, that is, filters **6*a* to 6*n*, because the 60 mc. amplifier, amplifier-limiter 4, does not have sufficient bandwidth to pass these beat frequency signals. In the presence of a second carrier differing in frequency from the first, there will be another output from mixer 5 corresponding to one of the filters 6*a* to 6*n*. This beat frequency signal will be passed by its corresponding filter to product multiplier 7. For example, if a 71 mc. signal were present, the beat frequency signal at the output of mixer 5 would be an 11 mc. signal and would be passed by an 11 mc. filter, such as filter 6*a*, and would be remixed at product multiplier 7** with the 71 mc. carrier signal. Since the 60 mc. reference signal was assumed to be fixed, it is apparent that the phase and frequency of the 11 mc. beat frequency signal will be precisely correct so as to add the resultant beat frequency product at the output of product multiplier 7 in phase with the 60 mc. signal produced by the 70 mc. thereby accomplishing cophasal addition of the input signals. The operation of the combiner is automatic and can be extended to operate on $n$ carriers simply by adding $n$ filters 6.

Since as was pointed out hereinabove, product multiplier 7 is an amplitude product-taking device as well as a frequency heterodyning device, the resultant output is proportional to the product of the amplitude of the incoming signal and the amplitude of the beat frequency signal passed through filters 6 or, in other words, proportional to the square of the amplitude of the input carrier signal. Therefore, the predetection combiner as described is a ratio squared predetection cambiner. If linear combining were necessary or required, a limiter 9 could be added to the circuit from the output of amplifier 2 to product multiplier 7 by movement of ganged switches 10 and 11 to the appropriate contacts to maintain one of the signals coupled to product multiplier 7 constant and thereby provide proportional outputs. Another alternative of providing a linear combiner is to provide limiters 12 at the output of each of the bandpass filters 6 to produce a constant input to product multiplier 7 thereby removing the weighting of signal amplitudes to produce equal gain predetection combining. The employment of switches 10, 11, 13 and 14 enables the selection of either a linear or a ratio squared characteristic for the resultant output signal. Of course if linear combining were desired still another alternative is to substitute a conventional mixer for product multiplier 7.

A diversity system having greater reliability employing both angle diversity and space diversity techniques or angle diversity in conjunction with a plurality of antennas is illustrated in the figure. Source 17 could be a second receiver and antenna system cooperating with the receiver and antenna system of source 1 in accordance with space diversity techniques, that is, receiving the same signals as source 1 but uncorrelated with the signals at source 1 due to the antenna spacing, or a second receiver and antenna system arranged to double the fold of an angle diversity system operating on signals spaced in frequency from the frequency of the signals of source 1 by an amount equal to less than one half the bandwidth of amplifier-limiter 4. The single output of source 17 is coupled to circuit arrangement 3′ including therein equipment identical in structure and function to that described above with respect to the circuit arrangement 3. For instance, the single output of source 17 is coupled to IF amplifier 2′ and, hence, to mixer 5′, filters 6′ and product multiplier 7′ to provide at the output of product multiplier 7′ a 60 mc. signal precisely correct in phase and frequency for cophasal addition with the resultant output from product multiplier 7, each of these resultant outputs containing contributions from the cophasal combining of the signals of each source of signals 1 and 17, respective. Cophasal addition of the resultant outputs of product multipliers 7 and 7′ is accomplished since the output of amplifier-limiter 4 is utilized as the oscillator signal for the first mixing process taking place in both mixers 5 and 5′. As described above, the appropriate switching of the limiters into a selected one of the inputs to product multiplier 7 will enable the selection of a linear or a ratio squared characteristic for the output signal and, of course, it would be preferred that the same characteristic be chosen for each of the circuit arrangements.

The filters 6′ would have to be tuned to the appropriate frequency where the signals of source 17 have a different frequency than the signals of source 1 so that when the beat frequencies are remixed with the input signals the reference signal having a single frequency, the 60 mc. signals in the example employed herein, is obtained.

An examination of the various components in a predetection combiner indicates that the bandwidth of the system preceding the combiner must be sufficient to carry all the received carriers when translated to the intermediate frequency region, for instance, the 70 mc. region. The bandwidth of amplifier-limiter 4 at for instance 60 mc. need only be wide enough to sustain any modulation products on a single one of the frequency modulated input signal. The intermediate filters, filters 6, which separate the various carriers of the signals of a single source, need only respond to the carrier components of each of the input signals from an associated source. This is apparent if it is realized that the beat frequency resulting from the reference signal, the 60 mc. signal, and the incoming 70 mc. signal, both of which are similarly frequency modulated, is a 10 mc. signal devoid of modulation since the modulation is cancelled in the action of mixer 5. The filters 6, therefore, need only be as wide as the anticipated phase modulation of the particular input carrier signal caused by the propagation medium. This feature permits the use of very narrow band filters of the order of 100 to 500 cycles per second for filters 6 and as a consequence improves the noise immunity of the circuit. This does not imply a corresponding tolerance on the absolute input frequencies but rather on their spacing. The 60 mc. output, the reference signal, will adjust to accommodate any common drifts.

The presence of noise alone on any one or more of the signals may create beat frequency signals that will get through filters 6 but after transmission through filters 6 the output will be uncorrelated with the original noise signal. The correlation between the very narrow band sample of noise as represented by the narrow band filters 6 and the incoming noise spectrum will result in a very small output from the product multiplier 7. This output will be so small that the loop gain of the system is less than unity. In this case the system does not become regenerative and, hence, the system does not respond to a noise input and tends to discriminate against one or more noisy channels in the presence of strong signals. This behavior is to be expected of a ratio squared combiner.

The predetection combiner of this invention has several advantages. The operational threshold is limited by a very narrow band filter, such as filters 6, which discriminates against noise and, hence, reduces the carrier-to-noise ratio at which the system will operate. The expansion of the system to high order, that is, a high number of folds of diversity combining is accomplished by the addition of a filter 6 for each fold of diversity, or diversity signal, added to the diversity system with no change whatsoever in the remainder of the system. The combiner will effectively operate upon a series of carriers spaced at 20 kc. and modulated by a frequency of about 100 kc. with modulation indices in the order of 5 or 10 provided that the modulations are all coherent. Carrier separation and optimum combining will result even though the deviations overlap considerably.

The predetection combiner, as described hereinabove, has particular utility in connection with the relatively new technique of angle diversity where a number of beams are energized by means of independent transmitters at different frequencies and a corresponding number of receiving beams are oriented so as to intersect their mates in the antenna array. In the prior art each receiving beam had its own receiver, while in the arrangement described herein in connection with source 1 a single receiver would be associated with all the receiving beams. To make more efficient use of the scatter volume and obtain an increase in system gain, the arrangement illustrated in the figure with respect to sources 1 and 17 would be employed. This mode of operation of the angle diversity system is implemented by allowing two receivers (sources 1 and 17) to each accept carrier frequencies $f_1, f_2 \ldots f_m$ and combining these signals coherently when the two receiver outputs are combined. This latter arrangement provides about twice the power output of the former arrangement.

It is to be understood that the angle diversity system employing the combiner described herein may utilize a single receiving antenna beam which is capable of receiving all the frequencies of the transmitted beams which when combined in the arrangement of this invention maintains the advantages of the angle diversity technique without the necessity of a complex receiving beam pattern.

The predetection combiner of this invention will enable the full implementation of an angle diversity system without employing a complexity of equipment where the order of diversity can be relatively high and controlled by the formula $M \times N \times O$, where M is the number of beams, N is the number of frequencies received by any one beam, and O is the number of spaced separated antennas.

While I have described above the principles of my invention in connection with specific apparatus, it is to be clearly understood that this description is made only by way of example and not as a limitation to the scope of my invention as set forth in the objects thereof and in the accompanying claims.

I claim:

1. An automatic phase control system comprising a source of a plurality of input signals having unknown phase relative to each other, a first means coupled to said source to produce in response to a given signal and said input signals a plurality of predetermined signals, a plurality of second means coupled to said first means each responding to a different one of said predetermined signals, a third means coupled to the output of each of said second means and said source to produce said given signal having a predetermined frequency and an amplitude related to the cophasal addition of said input signals, and a fourth means to couple said given signal to said first means.

2. An automatic phase control system comprising a source of a plurality of frequency spaced input signals having unknown phase relative to each other, a first means coupled to said source to produce in response to a given signal and said input signals a plurality of frequency spaced beat frequency signals, a plurality of second means coupled to said first means each responding to a different one of said beat frequency signals, a third means coupled to the output of each of said second means and said source to produce said given signal having a predetermined beat frequency and an amplitude related to the cophasal addition of said input signals, and a fourth means to couple said given signal and to said first means.

3. An automatic phase control system comprising a plurality of signal sources, the signal of each of said sources including a plurality of frequency spaced input signals having unknown phase relative to each other, a circuit arrangement coupled to each of said sources including a first means coupled to the associated one of said sources to produce in response to a given signal and said input signals of said associated one of said sources a plurality of frequency spaced beat frequency signals, a plurality of second means coupled to said first means each responding to a different one of said beat frequency signals, and a third means coupled to the output of each of said second means and said associated one of said sources to produce an output signal having a predetermined beat frequency and an amplitude related to the cophasal addition of said input signals of said associated one of said sources, a fourth means coupled to said third means of each of said circuit arrangements to combine said output signals to produce said given signal having said predetermined beat frequency and an amplitude related to the cophasal addition of said output signals, and fifth means to couple said given signal to said first means of each of said circuit arrangements.

4. A predetection diversity combiner comprising a source of a plurality of diversity signals having unknown phase relative to each other, a first means coupled to said source to produce in response to a given signal and said diversity signals a plurality of predetermined signals, a plurality of second means coupled to said first means each responding to a different one of said predetermined signals, a third means coupled to the output of each of said second means and said source to produce said given signal having a predetermined frequency and an amplitude related to the cophasal addition of said diversity signals, and fourth means to couple said given signal to said first means.

5. A predetection diversity combiner comprising a source of a plurality of frequency spaced diversity signals having unknown phase relative to each other, a first means coupled to said source to produce in response to a given signal and said diversity signals a plurality of frequency spaced beat frequency signals, a plurality of second means coupled to said first means each responding to a different one of said beat frequency signals, a third means coupled to the output of each of said second means and said source to produce said given signal having a predetermined beat frequency and an amplitude related to the cophasal addition of said diversity signals, fourth means to couple said given signal to said first means, and fifth means coupled to said fourth means to utilize said given signal.

6. A predetection diversity combiner comprising a source of a plurality of frequency spaced diversity signals having unknown phase relative to each other, a first means coupled to said source to produce in response to a given signal and said diversity signals a plurality of frequency spaced beat frequency signals, a plurality of second means coupled to said first means each responding to a different one of said beat frequency signals, a multiplying means coupled to the output of each of said second means and said source to produce said given signal having a predetermined beat frequency and an amplitude related to the cophasal addition of said diversity signals, a third means to couple said given signal to said first means, and fourth means coupled to said third means to utilize said given signal.

7. A predetection diversity combiner comprising a source of a plurality of frequency spaced diversity signals having unknown phase relative to each other, a first means coupled to said source to produce in response to a given signal and said diversity signals a plurality of frequency spaced beat frequency signals, a plurality of second means coupled to said first means each responding to a different one of said beat frequency signals, an amplitude limiting means coupled to each of said second means, a multiplying means coupled to the output of each of said limiting means and said source to produce said given signal having a predetermined beat frequency and an amplitude related to the cophasal addition of said diversity signals, a third means to couple said given signal to said first means, and a fourth means coupled to said third means to utilize said given signal.

8. A predetection diversity combiner comprising a source of a plurality of frequency spaced diversity signals having unknown phase relative to each other, a first means coupled to said source to produce in response to a given signal and said diversity signals a plurality of frequency spaced beat frequency signals, a plurality of second means coupled to said first means each responding to a different one of said beat frequency signals, amplitude limiting means coupled to said source, a multiplying means coupled to the output of each of said second means and said limiting means to produce said given signal having a predetermined beat frequency and an amplitude related to the cophasal addition of said diversity signals, a third means to couple said given signal to said first means, and fourth means coupled to said third means to utilize said given signal.

9. A predetection diversity combiner comprising a source of a plurality of frequency spaced diversity signals having unknown phase relative to each other, a first means coupled to said source to produce in response to a given signal and said diversity signals a plurality of frequency spaced beat frequency signals, a plurality of frequency responsive means coupled to said first means each responding to a different one of said beat frequency signals, a second means coupled to the output of each of said frequency responsive means and said source to produce said given signal having a predetermined beat frequency and an amplitude related to the cophasal addition of said diversity signals, a third means to couple said given signal to said first means, and fourth means coupled to said third means to utilize said given signal.

10. A predetection diversity combiner comprising a source of a plurality of frequency spaced diversity signals having unknown phase relative to each other, a converter coupled to said source to produce in response to a given signal and said diversity signals a plurality of frequency spaced beat frequency signals, a plurality of first means coupled to said converter each responding to a different one of said beat frequency signals, a second means coupled to the output of each of said first means and said source to produce said given signal having a predetermined beat frequency and an amplitude related to the cophasal addition of said diversity signals, third means to couple said given signal to said converter, and fourth means coupled to said third means to utilize said given signal.

11. A predetection diversity converter comprising a source of a plurality of frequency spaced diversity signals having unknown phase relative to each other, a mixer coupled to said source to produce in response to a given signal and said diversity signals a plurality of frequency spaced beat frequency signals, a plurality of tuned filters coupled to said mixer each responding to a different one of said beat frequency signals, a first means coupled to the output of each of said filters and said source to produce said given signal having a predetermined beat frequency and an amplitude related to the cophasal addition of said diversity signals, a second means to couple said given signal to said mixer, and a third means coupled to said second means to utilize said given signal.

12. A predetection diversity combiner comprising a source of a plurality of frequency spaced diversity signals having unknown phase relative to each other, a mixer coupled to said source to produce in response to a given signal and said diversity signals a plurality of frequency spaced beat frequency signals, a plurality of first means coupled to said mixer each responding to a different one of said beat frequency signals, a product multiplier coupled to the output of each of said first means and said source to produce said given signal having a predetermined beat frequency and an amplitude related to the cophasal addition of said diversity signals, a second means to couple said given signal to said mixer, and third means coupled to said second means to utilize said given signal.

13. A predetection diversity combiner comprising a source of a plurality of frequency spaced diversity signals having unknown phase relative to each other, a first means coupled to said source to produce in response to a given signal and said diversity signals a plurality of frequency spaced beat frequency signals, a plurality of tuned filters coupled to said first means each responding to a different one of said beat frequency signals, a product multiplier coupled to the output of each of said filters and said source to produce said given signal having a predetermined beat frequency and an amplitude related to the cophasal addition of said diversity signals, second means to couple said given signal to said first means, and third means coupled to said second means to utilize said given signal.

14. A predetection diversity combiner comprising a source of a plurality of frequency spaced diversity signals having unknown phase relative to each other, a mixer coupled to said source to produce in response to a given signal and said diversity signals a plurality of frequency spaced beat frequency signals, a plurality of tuned filters coupled to said mixer each responding to a different one of said beat frequency signals, a product multiplier coupled to the output of each of said filters and said source to produce said given signal having a predetermined beat frequency and an amplitude related to the cophasal addition of said diversity signals, first means to couple said given signal to said mixer, and second means coupled to said first means to utilize said given signal.

15. A predetection diversity combiner comprising a source of a plurality of frequency spaced diversity signals having unknown phase relative to each other, a mixer coupled to said source to produce in response to a given signal and said diversity signals a plurality of frequency spaced beat frequency signals, a plurality of tuned filters coupled to said mixer each responding to a different one of said beat frequency signals, a product multiplier coupled to the output of each of said filters and said source to produce said given signal having a predetermined beat frequency and an amplitude related to the cophasal addition of said diversity signals, an amplifier limiter coupled to the output of said product multiplier, a first means coupled to the output of said amplifier limiter to couple said given signal to said mixer, and a second means coupled to the output of said amplifier limiter to utilize said given signal.

16. A predetection diversity combiner comprising a plurality of signal sources, the signal of each of said sources including a plurality of frequency spaced diversity signals having unknown phase relative to each other and the signals of the others of said sources, a circuit arrangement coupled to each of said sources including a first means coupled to the associated one of said sources to produce in response to a given signal and said diversity signals of said associated one of said sources a plurality of frequency spaced beat frequency signals, a plurality of second means coupled to said first means each responding to a different one of said beat frequency signals, and a third means coupled to the output of each of said plurality of second means and said source to produce an output signal having a predetermined beat frequency and an amplitude related to the cophasal addition of said diversity signals of said associated one of said sources, fourth means coupled to said third means of each of said circuit arrangements to combine said output signals to produce said given signal having said predetermined beat frequency and an amplitude related to the cophasal addition of said output signals, a fifth means to couple said given signal to said first means of each of said circuit arrangements, and sixth means coupled to said fifth means to utilize said given signal.

17. A predetection combiner comprising a plurality of signal sources, the signal of each of said sources including a plurality of frequency spaced diversity signals having unknown phase relative to each other and the signals of the others of said sources, a circuit arrangement coupled to each of said sources including a mixer coupled to the associated one of said sources to produce in response to a given signal and said diversity signals of said associated one of said sources a plurality of frequency spaced beat frequency signals, a plurality of first means coupled to said mixer each responding to a different one of said beat frequency signals, and a product multiplier coupled to the output of each of said plurality of first means and said source to produce an output signal having a predetermined beat frequency and an amplitude related to the cophasal addition of said diversity signals of said associated one of said sources, second means coupled to said product multiplier of each of said circuit arrangements to combine said output signals to produce said given signal having said predetermined beat frequency and an amplitude related to the cophasal addition of said output signals, a third means to couple said given signal to said mixer of each of said circuit arrangements, and fourth means coupled to said third means to utilize said given signal.

18. A predetection diversity combiner comprising a plurality of signal sources, the signal of each of said sources including a plurality of frequency spaced diversity signals having unknown phase relative to each other and the signals of the others of said sources, a circuit arrangement coupled to each of said sources including a first means coupled to the associated one of said sources to produce in response to a given signal and said diversity signals of said associated one of said sources a plurality of frequency spaced beat frequency signals, a plurality of tuned filters coupled to said first means each responding to a different one of said beat frequency signals, and a balanced multiplier coupled to the output of each of said plurality of tuned filters and said source to produce an output signal having a predetermined beat frequency and an amplitude related to the cophasal addition of said diversity signals of said associated one of said sources, second means coupled to said product multiplier of each of said circuit arrangements to combine said output signals to produce said given signal having said predetermined beat frequency and an amplitude related to the cophasal addition of said output signals, a third means to couple said given signal to said first means of each of said circuit arrangements, and fourth means coupled to said third means to utilize said given signal.

19. A predetection diversity combiner comprising a plurality of signal sources, the signal of each of said sources including a plurality of frequency spaced diversity signals having unknown phase relative to each other and the signals of the others of said sources, a circuit arrangement coupled to each of said sources including a mixer coupled to the associated one of said sources to produce in response to a given signal and said diversity signals of said associated one of said sources a plurality of frequency spaced beat frequency signals, a plurality of tuned filters coupled to said mixer each responding to a different one of said beat frequency signals, and a product multiplier coupled to the output of each of said plurality of tuned filters and said source to produce an output signal having a predetermined beat frequency and an amplitude related to the cophasal addition of said diversity signals of said associated one of said sources, first means coupled to said product multiplier of each of said circuit arrangements to combine said output signals to produce said given signal having said predetermined beat frequency and an amplitude related to the cophasal addition of said output signals, a second means to couple said given signal to said mixer of each of said circuit arrangements, and third means coupled to said second means to utilize said given signal.

20. A predetection diversity combiner comprising a plurality of signal sources, the signal of each of said sources including a plurality of frequency spaced diversity signals having unknown phase relative to each other and the signals of the others of said sources, a circuit arrangement coupled to each of said sources including a mixer coupled to the associated one of said sources to produce in response to a given signal and said diversity signals of said associated one of said sources a plurality of frequency spaced beat frequency signals, a plurality of tuned filters coupled to said mixer each responding to a different one of said beat frequency signals, and a product multiplier coupled to the output of each of said plurality of tuned filters and said source to produce an output signal having a predetermined beat frequency and an amplitude related to the cophasal addition of said diversity signals of said associated one of said sources, an amplifier-limiter coupled to said product multiplier of each of said circuit arrangements to combine said output signals to produce said given signal having said predetermined beat frequency and an amplitude related to the cophasal addition of said output signals, a first means coupled to the output of said amplifier-limiter to couple said given signal to said mixer of each of said circuit arrangements, and second means coupled to the output of said amplifier-limiter to utilize said given signal.

References Cited in the file of this patent

UNITED STATES PATENTS

| | | |
|---|---|---|
| 2,574,326 | Goldstine | Nov. 6, 1951 |
| 2,777,064 | Robinson | Jan. 8, 1957 |